(12) United States Patent
Shafer et al.

(10) Patent No.: US 7,592,375 B2
(45) Date of Patent: Sep. 22, 2009

(54) ION CONDUCTIVE POLYMERS AND IMIDE MONOMERS

(75) Inventors: Greg Shafer, Chaffee, NY (US); Masaya Kawasumi, Anjyo (JP); Yoichi Hosokawa, Nagoya (JP); Naoki Hasegawa, Kasugai (JP); Satoru Yamamoto, Nagoya (JP); Kenji Imai, Komaki (JP); Yuko Murayama, Nisshin (JP); Shiaki Hyodo, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 355 days.

(21) Appl. No.: 11/415,116

(22) Filed: May 2, 2006

(65) Prior Publication Data

US 2006/0258759 A1    Nov. 16, 2006

(30) Foreign Application Priority Data

May 13, 2005    (JP)    ............................. 2005-141234

(51) Int. Cl.
C08J 5/20    (2006.01)
(52) U.S. Cl. .............................. 521/27; 568/32; 549/51; 564/82; 564/83; 525/326.2; 525/326.3; 525/326.4; 525/374
(58) Field of Classification Search .................... 568/32; 549/51; 564/82, 83; 525/326.2, 326.3, 326.4, 525/374
See application file for complete search history.

(56) References Cited

U.S. PATENT DOCUMENTS 5,874,616 A * 2/1999 Howells et al. ................ 564/82
6,420,607 B1 * 7/2002 Hamrock et al. .............. 568/32

2005/0004335 A1    1/2005 Kamiya et al.

FOREIGN PATENT DOCUMENTS

| JP | 2002-280019 | 9/2002 |
|---|---|---|
| JP | 2002-289222 | 10/2002 |
| JP | 2003-109624 | 4/2003 |
| JP | 2003-246906 | 9/2003 |
| JP | 2003-525957 | 9/2003 |

OTHER PUBLICATIONS

Geiculescu et al Dilithium bis[(perfluoroalkyl)sulfonyl]diimide salts as electrolytes for rechargeable lithium batteries, Journal of Fluorine Chemistry, 125 (2004), 1179-1185.*
Jin Nie, et al., "Synthesis and characterization of a novel electrolyte based on bis[(perfluoroalkyl)sulfonyl]triimide trianion", Journal of Fluorine Chemistry 125, 2004, pp. 27-31.

* cited by examiner

*Primary Examiner*—James Seidleck
*Assistant Examiner*—Gregory Listvoyb
(74) *Attorney, Agent, or Firm*—Oblon, Spivak, McClelland, Maier & Neustadt, L.L.P.

(57) ABSTRACT

Disclosed herein is an ion conductive polymer comprising a unit represented by Formula (1) below:

$$-SO_2[N^-SO_2(M^+)]_{X1}- \qquad (1)$$

wherein $X_1$ is an integer greater than 1, and $M^+$ is $H^+$ or $Li^+$.

Further disclosed is an imide monomer represented by Formula (A) below:

$$Z_1-SO_2[N^-SO_2M^+]_Y-Z_2 \qquad (A)$$

wherein Y is an integer of 2 or greater,
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

8 Claims, 1 Drawing Sheet

FIG. 1

C, D At $n \geq 8$, Clear channel structures are formed

⇒ Formation of stable film structure } Great
Improvement in proton conductivity } expectations

ION CONDUCTIVE POLYMERS AND IMIDE MONOMERS

BACKGROUND OF THE INVENTION

1. Field of the Invention

The present invention relates to ion conductive polymers and imide monomers. More specifically, the present invention relates to ion conductive polymers suitable as electrolyte membranes for use in a variety of electrochemical devices, including fuel cells, secondary batteries, water electrolyzers, hydrohalogenic acid electrolyzers and sodium chloride electrolyzers, oxygen and/or hydrogen concentrators, humidity sensors, gas sensors, and the like, as proton conductors for use in electrolytes in the catalyst layers or as lithium ion conductors for use in lithium ion batteries, and the like, and further relates to imide monomers for the preparation of the ion conductive polymers.

2. Description of the Related Art

Solid polymer electrolytes are solid polymeric materials that have ion exchange groups, e.g., sulfonic acid groups, in their polymer chains, and function as ionic conductors for transporting ions, such as protons and lithium ions.

For example, solid polymer electrolytes for use in a variety of electrochemical devices, including solid polymer fuel cells, water electrolyzers, etc., are shaped into a membrane and are used in the form of a membrane-electrode assembly (MEA) wherein a pair of electrodes are bonded to both surfaces of the electrolyte membrane. General electrodes for use in solid polymer fuel cells have a bilayer structure consisting of a diffusion layer and a catalyst layer. The diffusion layer is a layer for supplying a reactive gas and electrons to the catalyst layer, and is made of a carbon fiber, a carbon paper, or the like. The catalyst layer is a portion where an electrode reaction is taken place, and is commonly composed of a composite of an electrode catalyst and a solid polymer electrolyte.

Fluorine-based electrolytes, typified by Nafion (registered trademark for products manufactured by DuPont), and hydrocarbon-based electrolytes have been known as solid polymer electrolytes for use in a variety of electrochemical devices. Since perfluorinated electrolytes have superior durability over hydrocarbon-based electrolytes, they are widely used in water electrolyzers, fuel cells, and other devices. However, perfluorinated electrolytes, e.g., Nafion (registered trademark), are highly priced. And, solid polymer electrolytes for use in electrochemical devices are required to have better performance in order to improve the performance of the electrochemical devices using the solid polymer electrolytes.

Various proposals have been made to solve these problems. For example, Patent Publication 1 discloses an ion conductive polymer which has a main chain of a hydrocarbon-based polymer, such as a polyphenylene backbone, a polyester backbone, etc. And the ion conductive polymer has such structure that a protonic acid group, such as a sulfonic acid group, etc., is separated from the main chain by a spacer structure formed by an alkyl or aryl group, etc. In addition, Patent Publication 1 describes that the presence of the spacer structure separating the protonic acid group from the main chain allows the ion conductive polymer to exhibit superior ion conducting properties and high heat resistance.

Further, Patent Publication 2 discloses an ion conductive polymer membrane for a fuel cell which is composed of polyamide containing a protonic acid group, such as a sulfonic acid group, etc. Further, Patent Publication 3 discloses an ion conductive polymer membrane that is composed of a mixture of a protonic acid group-containing polyamide with a halogenated hydrocarbon resin, a polyfluorovinylidene resin or the like. Patent Publication 2 describes that the polymer membrane composed of a protonic acid group-containing polyamide exhibits excellent film-forming ability, superior ion conducting properties and high heat resistance.

Further, Patent Publication 4 discloses a polymer prepared by homopolymerization of lithium N-(trifluoromethanesulfonyl)-2-(4-ethenylphenoxy) tetrafluoroethane sulfone imide ($CH_2=CH-C_6H_4-O-CF_2CF_2SO_2N(Li)SO_2CF_3$). Patent Publication 4 describes that the styrene-based polymer exhibits high solubility in various kinds of organic solvents, making it easy to shape, and it can be prepared at low costs due to the low content of fluorine.

Further, Patent Publication 5 discloses a fluorine-based copolymer-containing composition which includes a perfluorinated copolymer including $-CF_2CF_2-$, $-CF_2CF(-O-(CF_2CF(CF_3)-O)_n-(CF_2)_m-SO_2F)-$ and $-CF_2CF(-O-(CF_2CF(CF_3)-O)_{n'}-(CF_2)_{m'}-SO_2NHR)-$ as repeating units, and a liquid fluorooligo ether consisting of one or more kinds of a repeating unit represented by $-(R_f-O)-$. Patent Publication 5 describes that a sulfone imide crosslinked structure can be introduced into the perfluorinated copolymer by reacting a $SO_2F$ type group with a $SO_2NHR$ type group in the presence of a Lewis base, and the introduction of the crosslinked structure results in improved durability.

Non-Patent Publication 1 discloses trisodium bis[(perfluoroalkyl) sulfonyl]triimide ($C_4F_9-SO_2N^-Na^+SO_2N^-Na^+SO_2N^-Na^+SO_2C_4F_9$) prepared by reaction of $C_4F_9SO_2NHNa$ and $HN(SO_2Cl)_2$. Non-Patent Publication 1 describes that the trisodium salt is more electrochemically stable than NaHFPSI ($((CF_3)_2CHO-SO_2)_2NNa$) and NaTFSI ($(CF_3SO_2)_2NNa$) and that a solution (0.01 M) of the trisodium salt in DMF exhibits a higher electrical conductivity than a solution (0.01M) of NaHFPSI or NaTFSI in DMF.

[Patent Publication 1] Japanese Patent Unexamined Publication No. 2002-289222, Paragraph No. [0007] and [0022]-[0026]

[Patent Publication 2] Japanese Patent Unexamined Publication No. 2002-280019, claim 1, Paragraph No. [0009]

[Patent Publication 3] Japanese Patent Unexamined Publication No. 2003-109624, claim 3, Paragraph No. [0072]

[Patent Publication 4] Japanese Patent Unexamined Publication No. 2003-525957, Paragraph No. [0032] and

[Patent Publication 5] Japanese Patent Unexamined Publication No. 2003-246906, claim 1, Paragraph No. [0057]

[Non-Patent Publication 1] "Synthesis and characterization of a Novel electrolyte based on bis(perfluoroalkyl)sulfonyl)triimide trianion", J. Nie et al., J. Fluorine Chemistry, 125 (2004) 27-31

The solid polymer electrolytes disclosed in Patent Publications 1 to 4 have C—H bonds within their molecules and show poor resistance to peroxide radicals. Accordingly, if the solid polymer electrolytes are used in the production of separators for water electrolyzers and electrolyte membranes for fuel cells, the separators and membranes are degraded by peroxide radicals and thus high durability is not attained. Perfluorinated electrolytes having excellent oxidation resistance and high durability are commonly used in the production of the membranes and separators. However, the membranes and separators produced using perfluorinated electrolytes may be degraded under extreme conditions of use. For these reasons, solid polymer electrolytes used in the production of membranes and separators are required to have excellent oxidation resistance and high durability.

The performance of electrochemical devices is dependent on that of solid polymer electrolytes used in the fabrication of the devices. Generally, the performance of electrochemical devices is improved as the proton conductivity of solid polymer electrolytes increases. To increase the proton conductivity of solid polymer electrolytes, methods for increasing the number of acid groups (e.g., sulfonic acid groups) present within the solid polymer electrolytes are commonly employed. However, swelling or dissolution of solid polymer electrolytes in water tends to increase with increasing number of acid groups present in the solid polymer electrolytes. For this reason, solid polymer electrolytes having high strength and excellent heat resistance are not attained by the methods.

To improve the efficiency of fuel cells, it is preferred to increase the operating temperature of the fuel cells. To this end, the use of solid polymer electrolytes having high strength and excellent heat resistance is desirable. However, since conventional perfluorinated electrolytes, typified by Nafion, are not crosslinked and have low crystallinity, they have problems of poor strength and heat resistance.

The sulfone imide group ($-SO_2NHSO_2-$) has a relatively high proton conductivity and is highly resistant to radicals. As taught in Patent Publication 5, the introduction of a sulfone imide crosslinked structure into a membrane by reaction of a $SO_2F$ type group with a $SO_2NHR$ type group leads to an improvement in the strength and heat resistance of the membrane.

However, only one proton in the sulfone imide group is effective. If the number of sulfone imide groups introduced is increased to increase the number of effective protons in an electrolyte, the resistance to swelling and resistance to dissolution in water of the electrolyte is deteriorated. In addition, the hydrophilicity of the sulfone imide group is insufficient, which makes it difficult to form effective ion channels in the electrolyte. Furthermore, the introduction of sulfone imide groups by crosslinking causes consumption of acid groups.

Accordingly, there is a limitation in simultaneously achieving high strength, excellent heat resistance and high proton conductivity in conventional electrolytes containing sulfone imide groups.

Further, the sodium salt of the trimide anion disclosed in Non-Patent Publication 1 has a low molecular weight and has no film-forming properties. In addition, there has been made no attempt to apply the trimide anion to a solid polymer electrolyte in order to improve both strength and ionic conductivity of the solid polymer electrolyte.

SUMMARY OF THE INVENTION

It is one object of the present invention to provide an ion conductive polymer having a high strength and a high ionic conductivity, and an imide monomer for the preparation of the ion conductive polymer.

It is another object of the present invention to provide an ion conductive polymer having excellent resistance to swelling and resistance to dissolution in water, plus high strength and high ionic conductivity, and an imide monomer for the preparation of the ion conductive polymer.

It is yet another object of the present invention to provide an ion conductive polymer having high resistance to radicals, plus high strength, high ionic conductivity and excellent resistance to swelling and resistance to dissolution in water, and an imide monomer for the preparation of the ion conductive polymer.

In accordance with one aspect of the present invention for achieving the above objects, there is provided an ion conductive polymer including a unit represented by Formula (1) below:

$$-SO_2[N^-SO_2(M^+)]_{X1}- \quad (1)$$

wherein $X_1$ is an integer greater than 1, and
$M^+$ is $H^+$ or $Li^+$.

In accordance with another aspect of the present invention, there is provided a first imide monomer represented by Formula (A) below:

$$Z_1-SO_2[N^-SO_2M^+]_y-Z_2 \quad (A)$$

wherein Y is an integer of 2 or greater,
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

In accordance with yet another aspect of the present invention, there is provided a second imide monomer represented by Formula (B) below:

$$Z_1-SO_2[N^-SO_2M^+]_{Y1+1}-R_f-SO_2[N^-SO_2M^+]_{Y2+1}-Z_2 \quad (B)$$

wherein $Y_1$ is an integer of 0 or greater,
$Y_2$ is an integer of 0 or greater,
$R_f$ is $-(CF_2)_m-$ (in which m is an integer from 1 to 19),
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

The unit of Formula (1) (hereinafter, referred to as a "multiimide unit") has more number of effective ionic species per unit than sulfone imide groups. In addition, the multiimide unit is relatively hydrophilic when compared to sulfone imide groups. Accordingly, the introduction of the multiimide unit into a polymer chain allows for a high ionic conductivity. In addition, when the backbone of the polymer chain is optimized, the ionic conductivity of the polymer can be improved while the strength and/or resistance to swelling and resistance to dissolution in water of the polymer are maintained. Furthermore, when the backbone of the polymer chain is composed of a fluorocarbon, high radical resistance of the polymer is attained.

DETAILED DESCRIPTION OF THE INVENTION

Hereinafter, a detailed description will be made of an embodiment of the present invention. The ion conductive polymer of the present invention includes a multiimide unit represented by Formula (1) below:

$$-SO_2[N^-SO_2(M^+)]_{X1}- \quad (1)$$

wherein $X_1$ is an integer greater than 1, and
$M^+$ is $H^+$ or $Li^+$.

$X_1$ represents the number of the ionic species ($M^+$), which is included in the multiimide unit, effectively contributing to the ionic conductivity of the polymer. As $X_1$ increases, i.e. the number of the ionic species per unit increases, the hydrophilicity of the multiimide unit increases, and as a result, the final ion conductive polymer exhibits a high ionic conductivity. However, when $X_1$ is too high, the resistance to swelling and resistance to dissolution in water of the polymer is deteriorated. For excellent resistance to swelling and resistance to dissolution in water of the ion conductive polymer, it is preferred that $X_1$ be from 2 to 4.

The multiimide unit may be introduced at any position of the polymer chain. For example, the multiimide unit may constitute a portion of the backbone of a straight-chained polymer. In a branched polymer consisting of a main chain and side chains, the multiimide unit may constitute a portion of either the main chain or the side chains, or portions of both the main chain and the side chains. The multiimide unit may constitute the crosslinking point of a crosslinked polymer or a portion other than the crosslinking point thereof.

The polymer chain into which the multiimide unit is introduced may be composed of a hydrocarbon or fluorocarbon backbone. The fluorocarbon backbone may be a partially or wholly fluorinated hydrocarbon backbone.

The term "hydrocarbon backbone" as used herein refers to a backbone in which C—H bonds are included but no C—F bond is included. The term "fluorocarbon backbone" refers to a backbone in which at least one C—F bond is included. The term "partially fluorinated hydrocarbon backbone" refers to a backbone in which both C—H and C—F bonds are included. The term "wholly fluorinated hydrocarbon backbone" refers to a backbone in which C—F bonds are included but no C—H bond is included. In the present invention, the "wholly fluorinated hydrocarbon backbone" is intended to include C—Cl bonds (e.g., —CFCl—, —CCl$_2$—, etc.) and other structures (e.g., —O—, —S—, —C(=O)—, —N(R)— (R=alkyl), etc.), in addition to C—F bonds.

The polymer chain may include at least one kind of backbone or, two or more kinds of backbones, selected from the above-mentioned backbones. Of these, the fluorocarbon backbone (particularly, wholly fluorinated hydrocarbon backbone) is particularly suitable because it is highly resistant to radicals.

Specific examples of the hydrocarbon backbone include those represented by the following groups (a1) through (a12):

[Chemical formula 1]

(n=1~20)
(a1)

(n=1~10)
(a2)

(a3)

(a4)

(a5)

(a6)

-continued (a7)

(a8)

(a9)

(R is an alkyl group)
(a10)

(a11)

(a12)

Specific examples of the partially fluorinated hydrocarbon backbone include those represented by the following (a13) through (a17):

[Chemical formula 2]

(m=1~10, n=1~10)
(a13)

(n=1~10)
(a14)

(n=1~10)
(a15)

(n=1~10)
(a16)

(a17)

Specific examples of the wholly fluorinated hydrocarbon backbone include those represented by the following groups (a18) through (a23):

[Chemical formula 3]

(a18) —(CF$_2$)$_n$— ($_n$=1~20)

(a19) —(CF$_2$—CF)$_n$— with CF$_3$ ($_n$=1~10)

(a20) —(CF$_2$—CF)$_n$— with ORf ($_n$=1~10)

(a21) —(CF$_2$—CF)$_n$— with Rf ($_n$=1~10)
(Rf is a fluorocarbon group)

(a22) perfluorinated benzene ring (a23) —(CF—CF)$_n$— bridged with O—(CF$_2$)$_m$—O ($_n$=1~10) ($_m$=1~10)

The amount of the multiimide unit included in the polymer chain is not especially limited. Generally, as the molar number of the multiimide unit per unit weight increases, the ionic conductivity of the polymer is increased. Meanwhile, too large an amount of the multiimide unit causes poor resistance to swelling and resistance to dissolution in water of the polymer. Therefore, it is preferred that the amount of the multiimide unit be properly selected according to the application of the ion conductive polymer and the characteristics required for the ion conductive polymer.

The molecular weight of the ion conductive polymer is not especially limited. Generally, as the molecular weight of the polymer increases, the strength and film-forming properties of the polymer are improved. For high strength and superior film-forming properties, the ion conductive polymer preferably has a molecular weight of 10,000 or higher, more preferably 20,000 or higher, and even more preferably 50,000 or higher.

When the ion conductive polymer has too high a molecular weight, the melt viscosity of the polymer is excessively increased and the solubility of the polymer in organic solvents is lowered or the solution viscosity is increased, thus making the formation of a film difficult. To achieve excellent resistance to swelling and resistance to dissolution in water and optimal film-forming properties, the molecular weight of the ion conductive polymer is preferably limited to 10,000,000 or lower, more preferably 5,000,000 or lower, and even more preferably 1,000,000 or lower.

The ion conductive polymer of the present invention may be used alone or in combination with a reinforcement, e.g., a porous film or a fibril fiber. Materials for the reinforcement may be varied, without any particular limitation, according to the intended applications.

As materials for the porous film to be combined with the ion conductive polymer of the present invention, there can be used, for example, polytetrafluoroethylene, polyimide, polyethylene, polyethylene tetrafluoroethylene, tetrafluoroethylene-perfluorovinyl ether copolymers (PFA), tetrafluoroethylene-hexafluoropropylene copolymers (FEP), porous silica, and porous ceramics.

In this case, the porosity, mean pore diameter and thickness of the porous film are optimally selected according to the application of the polymer-porous film composite and the characteristics required for the composite. Further, the ion conductive polymer may be uniformly dispersed within the porous film or delocalized on the surface or in the inside of the porous film.

Specific examples of the ion conductive polymer represented by Formula (1) are as follows.

A first embodiment of the ion conductive polymer includes a unit represented by Formula (2) (hereinafter, referred to as "unit (2)") below:

—(CF$_2$)$_n$—SO$_2$[N$^-$SO$_2$(M$^+$)]$_{X1}$—  (2)

wherein n is an integer from 1 to 19,

X$_1$ is an integer greater than 1, and

M$^+$ is H$^+$ or Li$^+$.

The unit (2) is a unit wherein the multiimide unit is bonded to the straight-chained wholly fluorinated hydrocarbon backbone. In Formula (2), n represents the number of carbon included in the backbone. Generally, as n increases, the resistance to swelling and resistance to dissolution in water of the polymer is improved but the solubility of the polymer in organic solvents is lowered or the solution viscosity of the polymer is increased, thus making the formation of a film difficult. To achieve sufficient film-forming properties, it is preferred that n be an integer of less than 20.

Meanwhile, as n decreases, the ionic conductivity of the polymer is increased but the resistance to swelling and resistance to dissolution in water of the polymer and the film strength are deteriorated. To achieve high ionic conductivity, excellent resistance to swelling and resistance to dissolution in water and high film strength, it is preferred that n be an integer of 8 or greater.

The ion conductive polymer may be selected from the following polymers:

(1) a polymer including the unit (2) in a portion of the polymer chain;

(2) a polymer including two or more repeated units (2) in a portion of the polymer chain; or (3) a polymer substantially composed of the repeated units (2) only.

In this case, the amount of the multiimide unit per unit weight and the molecular weight of the ion conductive polymer can be controlled by optimizing the value n of Formula (2), a structure other than the unit (2) in the case where the polymer chain includes the structure, and the number of the repeated units (2).

A second embodiment of the ion conductive polymer includes a unit represented by Formula (3) (hereinafter, referred to as "unit (3)") below:

—(CF$_2$)$_n$—SO$_2$[N$^-$SO$_2$(M$^+$)]$_{X1}$—(CF$_2$)$_m$—SO$_2$[N$^-$SO$_2$(M$^+$)]$_{X2}$—  (3)

wherein n is an integer from 1 to 19,
m is an integer from 1 to 19,
$X_1$ is an integer greater than 1,
$X_2$ is an integer greater than 1, and
$M^+$ is $H^+$ or $Li^+$.

The unit (3) is a unit wherein two kinds of the unit (2) are bonded to each other. The first unit (2) ($-(CF_2)_n-SO_2[N^-SO_2(M^+)]_{x1}-$) and the second unit (2) ($-(CF_2)_m-SO_2[N^-SO_2(M^+)])_{x2}-$) may be identical to or different from each other. That is, n and m, representing the number of carbon included in the respective wholly fluorinated hydrocarbon backbones, may be equal to or different from each other. Similarly, $X_1$ and $X_2$, representing the number of ionic species in the respective multiimide units, may be equal to or different from each other.

In the unit (3), as n and/or m increase, the resistance to swelling and resistance to dissolution in water and the film strength are improved but the film-forming properties of the polymer are deteriorated. Meanwhile, as n and/or m decrease, the ionic conductivity of the polymer is increased but the resistance to swelling and resistance to dissolution in water of the polymer and the film strength are deteriorated. Therefore, to achieve high ionic conductivity, excellent resistance to swelling and resistance to dissolution in water and high film strength, it is preferred that at least either n or m be an integer of 8 or greater.

The ion conductive polymer may be selected from the following polymers:

(1) a polymer including the unit (3) in a portion of the polymer chain;

(2) a polymer including two or more repeated units (3) in a portion of the polymer chain; or (3) a polymer substantially composed of the repeated units (3) only.

In this case, the amount of the multiimide unit per unit weight and the molecular weight of the ion conductive polymer can be controlled by optimizing the values m and n of Formula (3), a structure other than the unit (3) in the case where the polymer chain includes the structure, and the number of the repeated units (3).

Next, the functions of the ion conductive polymer according to the present invention will be described.

The polymer chain of the ion conductive polymer generally includes hydrophobic and hydrophilic moieties wherein the hydrophilic moieties aggregate to form ion channels within the polymer. As the size of the ion channels is relatively large, migration of ions is facilitated, thus attaining a high ionic conductivity.

However, since the hydrophilicity of a sulfone imide group is insufficient, it is difficult to form effective ion channels in a solid polymer electrolyte having the sulfone imide group. Further, one sulfone imide group has only one proton effectively contributing to the proton conductivity of the polymer. Accordingly, there is a limitation in the proton conductivity achievable in an ion conductive polymer having the sulfone imide group.

Since the multiimide unit is relatively hydrophilic when compared to the sulfone imide group, the introduction of the multiimide unit into an appropriate polymer chain enables the formation of relatively large ion channels within the polymer. In addition, the multiimide unit has relatively many effective ionic species per unit. Accordingly, the ion conductive polymer including the multiimide unit exhibits a higher proton conductivity than conventional ion conductive polymers. Furthermore, optimization of the multiimide unit and the backbone bonded with the multiimide unit allows the ion conductive polymer to have excellent oxidation resistance, high strength and/or excellent resistance to swelling and resistance to dissolution in water.

Next, the imide monomer of the present invention will be described.

A first embodiment of the imide monomer according to the present invention is represented by Formula (A) below:

$$Z_1\text{-}SO_2[N^-SO_2M^+]_Y\text{-}Z_2 \quad (A)$$

wherein Y is an integer of 2 or greater,
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

Y represents the number of the sulfone imide group ($-SO_2N^-M^+SO_2-$) included in the imide monomer. Generally, as Y increases, the multiimide unit has a large number of the ionic species ($M^+$) per unit. However, when Y is too high, the resistance to swelling and resistance to dissolution in water of the polymer and the film resistance are deteriorated. Therefore, it is preferred that the value of Y be optimally selected according to characteristics required for the polymer.

The groups $Z_1$ and $Z_2$ bonded to both ends of the imide monomer may be identical to or different from each other. The kind of the groups $Z_1$ and $Z_2$ can be suitably selected, without any particular limitation, according to the kind of other monomers used in the synthesis of the polymer. Particularly, since the imide monomer wherein each of the groups $Z_1$ and $Z_2$ is F or $NH_2$ is relatively highly reactive, it is suitable as a starting material for the synthesis of the ion conductive polymer according to the present invention.

A second embodiment of the imide monomer according to the present invention is represented by Formula (B) below:

$$Z_1\text{-}SO_2[N^-SO_2M^+]_{Y1+1}-R_f-SO_2[N^-SO_2M^+]_{Y2+1}\text{-}Z_2 \quad (B)$$

wherein $Y_1$ is an integer of 0 or greater,
$Y_2$ is an integer of 0 or greater,
$R_f$ is $-(CF_2)_m-$ (in which m is an integer from 1 to 19),
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

$Y_1$ and $Y_2$ each represents the number of the sulfone imide group ($-SO_2N^-M^+SO_2-$) included in the imide monomer. $Y_1$ and $Y_2$ may be identical to or different from each other.

The other definitions are the same as those described in the first embodiment, and descriptions thereof are omitted.

Next, a method for preparing the imide monomer of the present invention will be described.

The imide monomer wherein Y is 0 or 1 in Formula (A) is commercially available. Further, the imide monomers of Formulae (A) and (B) can be synthesized by using commercially available monomers as starting materials. One example of synthetic schemes is depicted by the following reactions (a) through (g).

[Chemical formula 4]

$$Cl-SO_2NCO + ClSO_3H \longrightarrow Cl-SO_2NHSO_2Cl \quad (a)$$

$$Cl-SO_2NHSO_2Cl + NH_3 \longrightarrow H_2NSO_2NHSO_2NH_2 \quad (b)$$

$$Cl-SO_2NHSO_2Cl + H_2NSO_2NH_2 \longrightarrow \quad (c)$$

For example, $ClSO_2NHSO_2Cl$ (bissulfonyl chloride) is prepared through the reaction (a). Specifically, $ClSO_2NCO$ is stirred in a flask in an ice bath, and then $ClSO_3H$ is added drop by drop thereto. After completion of the addition, the resulting solution is heated to 140 to 150° C. to evolve $CO_2$ from the flask. After 12 hours, the reaction is quenched and the solution is allowed to cool to room temperature. The resulting solution is distilled under vacuum at 110 to 120° C., and re-distilled in a micro-distiller, affording the desired product.

For example, $NH_2SO_2NHSO_2NH_2$ is prepared through the reaction (b). Specifically, a solution of bissulfonyl chloride in triethylamine (2.5 times on a molar basis) is cooled to the temperature of liquid nitrogen, and ammonia gas is fed thereto. The mixture is allowed to react overnight. The reaction mixture is made to be under reduced pressure to remove the remaining ammonia and triethylamine. Further, a desired product is extracted with ether, washed with acidic water, and recrystallized from alcohol, affording the desired product.

For example, $H_2N(SO_2NH)_YSO_2NH_2$ (Y=3) is prepared through the reaction (c). Specifically, an excess of $H_2NSO_2NH_2$ is added to disulfonyl chloride, and the resulting mixture is reacted in the presence of triethylamine at room temperature for 72 hours. The unreacted triethylamine is removed, followed by extraction with ether. The extract is washed with dilute hydrochloric acid and water, and distilled to remove the ether, affording the desired product.

For example, $Cl(SO_2NH)_{Y+4}SO_2Cl$ (Y is an integer of 0 or greater) is prepared through the reaction (d). Specifically, an excess of disulfonyl chloride is added to $H_2N(SO_2NH)_Y SO_2NH_2$ (Y is an integer of 0 or greater) and the resulting mixture is reacted in the presence of triethylamine at room temperature for 72 hours. The unreacted triethylamine is removed, followed by extraction with ether. The extract is washed with dilute hydrochloric acid and water, and distilled to remove the ether, affording the desired product.

For example, $H_2N(SO_2NH)_Y SO_2NH_2$ (Y is an integer of 0 or greater) is prepared through the reaction (e). Specifically, a solution of bissulfonyl chloride in triethylamine (2.5 times on a molar basis) is cooled to the temperature of liquid nitrogen, and ammonia gas is fed thereto. The mixture is allowed to react overnight. The reaction mixture is made to be under reduced pressure to remove the remaining ammonia and triethylamine, extracted with ether, washed with acidic water, and distilled to remove the solvent, affording the desired product.

For example, $ClSO_2(NHSO_2)_{Y+1}-R_f-(SO_2NH)_{Y+1}Cl$ (Y is an integer of 0 or greater) is prepared through the reaction (f). Specifically, an excess of $Cl(SO_2NH)_Y SO_2Cl$ is added to $NH_2O_2S-R_f-SO_2NH_2$ and the resulting mixture is reacted in the presence of a base (e.g., triethylamine).

Similarly, $NH_2SO_2(NHSO_2)_{Y+1}-R_f-(SO_2NH)_{Y+1}SO_2NH_2$ (Y is an integer of 0 or greater) is prepared through the reaction (g). Specifically, an excess of $NH_2(SO_2NH)_Y SO_2NH_2$ is added to $FO_2S-R_f-SO_2F$ and the resulting mixture is reacted in the presence of a base (e.g., triethylamine).

Other imide monomers that can be represented by Formulae (A) and (B) can be synthesized by any one of the reactions (a) through (g). Imide monomers wherein each of the groups $Z_1$ and $Z_2$ is not Cl or $NH_2$ are prepared by conversion of the groups in accordance with the known methods in the imide monomers synthesized by the above methods. In addition, if bissulfonyl chloride or bissulfonyl amide with two different numbers of the intermediate acid group ($-SO_2NHSO_2-$) is used as raw materials in the reaction (f) or (g), then imide monomers wherein the number of the intermediate acid group ($-SO_2NHSO_2-$) bonded to both ends of $R_f$ is different can be synthesized.

Next, a second monomer used in the preparation of the ion conductive polymer according to the present invention will be described. The ion conductive polymer of the present invention is prepared by reaction of an imide monomer with a second monomer.

The term "imide monomer" as used herein includes the monomer of Formula (A) or (B) and the monomer wherein Y is 0 or 1 in Formula (A).

The term "second monomer" as used herein means a monomer having two or more reactive groups in the molecular structure. The "reactive groups" mean groups that can react with the group $Z_1$ or $Z_2$ of the imide monomer to form the sulfone imide group or its derivative ($-SO_2N^-M^+SO_2-$).

The molecular weight of the second monomer is not especially limited and can be suitably selected according to the characteristics required for the ion conductive polymer and the application of the ion conductive polymer. Generally, as the molecular weight of the second monomer decreases, the number of the sulfone imide groups per unit weight increases, and as a result, the final polymer exhibits a high ionic conductivity. Meanwhile, as the molecular weight of the second monomer increases, the resistance to swelling and resistance to dissolution in water of the polymer as well as the film strength improved. However, too high a molecular weight of the second monomer causes a deterioration in the film-forming properties of the polymer.

The reactive groups may be directly reacted with the group $Z_1$ or $Z_2$ of the imide monomer to form the sulfone imide group or its derivative. Alternatively, after at least one group selected from the groups $Z_1$ and $Z_2$ is converted, the reactive groups may be reacted with the converted group to form the sulfone imide group or its derivative.

For example, if the groups $Z_1$ and $Z_2$ are halide groups, the reactive groups are preferably imide groups. Conversely, if the groups $Z_1$ are $Z_2$ are imide groups, the reactive groups are preferably halide groups.

The "halide group" as used herein means $-SO_2X$ (wherein X is F, Cl, Br, I or OH). Further, the "imide group" as used herein means $-SO_2NZ_5Z_6$ (wherein $Z_5$ and $Z_6$ are each independently H, M or $SiMe_3$, and M is a metal ion). The metal ion M included in the imide group is preferably a monovalent metal ion, e.g., Li, K or Na ion.

The halide group can be directly reacted with the imide group without conversion of the groups. Although these groups remain unreacted, an appropriate treatment can be carried out to convert the groups to sulfonic acid groups.

Since the halide group wherein X is F, Cl, Br or I is highly reactive, this halide group is suitable as the group $Z_1$ or $Z_2$ or a reactive group. Further, since the imide group wherein ($Z_5$, $Z_6$) are (H, H), (H, M), (SiMe$_3$, M) or (H, SiMe$_3$) is highly reactive, it is suitable as the group $Z_1$ or $Z_2$ or a reactive group.

The reactive groups included in the second monomer may be two or more groups. When the second monomer having three or more reactive groups is used as a starting material, a polymer whose chain is partially crosslinked can be prepared. In this case, the reactive groups included in the second monomer may be the same kind or the different kind.

Specific examples of hydrocarbon-based second monomers containing C—H bonds only include the following compounds (b1) to (b24):

[Chemical formula 5]

(b1)

(b2)

(b3)

(b4)

(b5)

(b6)

(b7)

(b8)

(b9)

(b10)

-continued

(b11)

(b12)

(b13)

(b14)

(b15)

(b16)

(b17)

(b18)

(b19)
(R: Alkyl group)

(b20)
(R: Alkyl group)

(b21)

(b22)

-continued (b23)

(b24)

wherein X is F, Cl, Br, I or OH, $Z_5$ and $Z_6$ are each independently H, M or SiMe$_3$, and M is a metal ion.

Specific examples of partially fluorinated hydrocarbon-based second monomers containing both C—H and C—F bonds include the following compounds (b25) to (b34):

[Chemical formula 6]

(b25)

($_{m=1\sim10, n=1\sim10}$)

(b26)

($_{m=1\sim10, n=1\sim10}$)

(b27)

($_{n=1\sim10}$)

(b28)

($_{n=1\sim10}$)

(b29)

($_{n=1\sim10}$)

(b30)

($_{n=1\sim10}$)

(b31)

($_{n=1\sim10}$)

(b32)

($_{n=1\sim10}$)

(b33)

(b34)

wherein X is F, Cl, Br, I or OH, $Z_5$ and $Z_6$ are each independently H, M or SiMe$_3$, and M is a metal ion.

Specific examples of wholly fluorinated hydrocarbon-based second monomers containing C—F bonds and no C—H bond include the following compounds (b35) to (b46):

[Chemical formula 7]

$$XSO_2-(CF_2)_n-SO_2X \quad (b35)$$

($_{n=1\sim20}$)

$$Z_6Z_5NSO_2-(CF_2)_n-SO_2NZ_5Z_6 \quad (b36)$$

($_{n=1\sim20}$)

$$XSO_2-(CF_2-\underset{\underset{CF_3}{|}}{CF})_n-SO_2X \quad (b37)$$

($_{n=1\sim10}$)

$$Z_6Z_5NSO_2-(CF_2-\underset{\underset{CF_3}{|}}{CF})_n-SO_2NZ_5Z_6 \quad (b38)$$

($_{n=1\sim10}$)

$$XSO_2-(CF_2-\underset{\underset{ORf}{|}}{CF})_n-SO_2X \quad (b39)$$

($_{n=1\sim10}$)

$$Z_6Z_5NSO_2-(CF_2-\underset{\underset{ORf}{|}}{CF})_n-SO_2NZ_5Z_6 \quad (b40)$$

($_{n=1\sim10}$)

$$XSO_2-(CF_2-\underset{\underset{Rf}{|}}{CF})_n-SO_2X \quad (b41)$$

($_{n=1\sim10}$)

$$Z_6Z_5NSO_2-(CF_2-\underset{\underset{Rf}{|}}{CF})_n-SO_2NZ_5Z_6 \quad (b42)$$

($_{n=1\sim10}$)

(b43)

(b44)

-continued wherein X is F, Cl, Br, I or OH, $Z_5$ and $Z_6$ are each independently H, M or $SiMe_3$, M is a metal ion, and $R_f$ is a fluorocarbon group.

Of these, the wholly fluorinated hydrocarbon-based monomers are particularly suitable as second monomers because the polymer chain is a perfluorinated backbone and thus the resulting ion conductive polymer exhibits excellent resistance to heat and oxidation.

In the case where the second monomer and the imide monomer are used in the synthesis of the ion conductive polymer, the second monomer may be used alone or in combination of two or more kinds. Likewise, the imide monomer may be used alone or in combination of two or more kinds.

In order to form the multiimide unit by using the imide monomer and the second monomer, one of the imide monomer and the second monomer is required to include at least one imide group (A) and at least one halide group (B).

Further, when it is intended to synthesize the ion conductive polymer wherein a plurality of multiimide units are introduced into the polymer chain, it is preferred that one of the imide monomer and the second monomer include at least two imide groups (A) and at least two halide groups (B).

For example, when the imide monomer (A-$SO_2$[$N^-SO_2M^+$]$_Y$—A, Y is an integer of 0 or greater) having two imide groups (A) is reacted with the second monomer (A-R—B, R is a hydrocarbon or fluorocarbon backbone) having one imide group (A) and one halide group (B), the imide groups (A) are reacted with the halide group (B) to form the sulfone imide group or its derivative (—$SO_2N^-M^+SO_2$—) in the bonding points of the monomers. As a result, an oligomer having the structure A-R—$SO_2$[N—$SO_2M^+$]$_{Y+2}$—R—A is prepared.

As the reaction further proceeds, the halide group (B) of the second monomer is bonded to one of the imide groups (A) present at both ends of the oligomer to form the sulfone imide group or its derivative in the bonding points. The above procedure is repeated to prepare the ion conductive polymer including one multiimide unit in the polymer chain.

As another example, when the imide monomer (A-$SO_2$[$N^-SO_2M^+$]$_Y$-A, Y is an integer of 0 or greater) having two imide groups (A) is reacted with the second monomer (B—R—B, R is a hydrocarbon or fluorocarbon backbone) having two halide groups (B), the imide groups (A) are reacted with the halide groups (B) to form the sulfone imide group or its derivative (—$SO_2N^-M^+SO_2$—) in the bonding points of the monomers. As a result, an oligomer having the structure B—R—$SO_2$[$N^-SO_2M^+$]$_{Y+2}$—R—B is prepared.

As the reaction further proceeds, the imide groups (A) of the imide monomer are bonded to the halide groups (B) present at both ends of the oligomer to form another sulfone imide group or its derivative in the bonding points. As a result, an oligomer having the structure A-$SO_2$[$N^-SO_2M^+$]$_{Y+1}$—R—$SO_2$[$N^-SO_2M^+$]$_{Y+2}$—R—$SO_2$[$N^-SO_2M^+$]$_{Y+1}$-A is prepared.

The halide groups (B) are further bonded to the imide groups (A) present at both ends of the oligomer to form a new multiimide unit in the bonding points. As a result, an oligomer having the structure B—{R—$SO_2$[$N^-SO_2M^+$]$_{Y+2}$}$_3$—R—B is prepared.

The above procedure is repeated to prepare the ion conductive polymer including a plurality of multiimide units in the polymer chain.

In the cases where the imide monomer represented by Formula (B) is used, two or more kinds of the imide monomer are used, two or more kinds of the second monomer are used and/or the second monomer having three or more reactive groups is used, a multiimide unit can be formed similarly. Further, in the case where at least one imide group (A) and at least one halide group (B) are included in one of a plurality of different kinds of monomers, a multiimide unit can be formed by reaction of the groups. Further, in the case where at least two imide groups (A) and at least two halide groups (B) are included in one of a plurality of different kinds of monomers, the ion conductive polymer including a plurality of multiimide units in the polymer chain is prepared.

Next, a method for preparing the second monomer will be described. Some second monomers having a reactive group are commercially available. Otherwise, some second monomers can be synthesized by converting the group of commercially available monomers, as starting materials, having a molecular structure similar to that of the commercially available second monomers to form a specific reactive group, in accordance with the known methods.

For example, a second monomer represented by the Formula $ClSO_2(CF_2)_nSO_2Cl$ is prepared by a method including the steps of:

(1) reacting a tetrafluoroethylene (TFE) oligomer with iodine to synthesize I—$(CF_2)_n$—I, (2) converting —I to —$SO_2Na$ using $Na_2S_2O_4$, and (3) converting —$SO_2Na$ to —$SO_2Cl$ using $Cl_2$.

Further, a reaction of the second monomer with KF enables the conversion of —$SO_2Cl$ to —$SO_2F$. Further, a further reaction with ammonia enables the conversion of —$SO_2F$ to —$SO_2NH_2$. In step (2), a reaction of —$SO_2Na$ with an acid enables the conversion —$SO_2Na$ to —$SO_3H$.

For example, the second monomer represented by the Formula $ClSO_2$—R—$SO_2Cl$ is prepared by treating $HOSO_2$—R—$SO_2OH$, which is synthesized by a common method, with $PCl_5$.

Next, a method for preparing the ion conductive polymer of the present invention will be described. The ion conductive polymer of the present invention can be synthesized by preparing a mixed solution of one or more kinds of the imide monomer and one or more kinds of the second monomer in a solvent, followed by reaction of the imide monomer with the second monomer.

In this case, the imide monomer may be directly reacted with the second monomer. Alternatively, the imide monomer may be reacted with the second monomer after appropriate conversion of the groups of the monomers. It is preferred to dissolve the imide monomer and the second monomer in a solvent capable of dissolving the monomers. The kind of the solvent is not particularly restricted, and may be suitably selected according to the kinds of the imide monomer and the second monomer. Further, the concentrations of the imide monomer and the second monomer in the solution are not particularly restricted, and may be suitably selected according to the kinds of the imide monomer and the second monomer.

The mixing ratio between the one or more kinds of the imide monomer and the one or more kinds of the second monomer is suitably selected according to the shape, application and characteristics required for the ion conductive polymer.

For example, when one kind of the imide monomer represented by Formula (A) and two kinds of the second monomer having different numbers of carbon atoms are used, the ion conductive polymer has partially different hydrophobic moieties in size and includes the multiimide unit.

As another example, when two kinds of the imide monomer having different numbers of the ionic species ($M^+$) and two kinds of the second monomer having different numbers of carbon atoms are used, the ion conductive polymer has partially different hydrophobic moieties in size and includes two different kinds of the multiimide unit having different numbers of the ionic species ($M^+$).

If the imide monomer is blended with the second monomer so that the molar number of the imide groups (A) is the same as that of the halide groups (B) included in the monomers, the multiimide unit and the sulfone imide group can be ideally formed from almost all functional groups. However, it is unnecessary to completely match the molar number of the imide groups (A) and that of the halide groups (B) included in the monomers. The molar number of the imide groups (A) may be slightly larger or smaller than that of the halide groups (B).

However, when the ratio of the molar number between the imide groups (A) and the halide groups (B) is considerably different from the theoretical value, the molecular weight of the ion conductive polymer is lowered, unreacted monomers or low-molecular weight oligomers remain inside the ion conductive polymer, and there is a risk that the unreacted monomers or oligomers may be unfavorably dissolved in use.

A reagent (i.e. a reagent having catalytic activity) capable of increasing the reaction rate between the imide group (A) and the halide group (B) may be added during the reaction of the imide monomer with the second monomer.

Specific examples of suitable reagents include basic compounds, such as triethylamine, trimethylamine, tripropylamine, tributylamine and diazabicycloundecene (DBU). The amount of the catalytic reagent is suitably selected according to the application of the ion conductive polymer and the characteristics required for the ion conductive polymer. The viscosity of the mixed solution can be controlled by optimizing the amount of the reagent.

Then, the mixed solution thus prepared is fed into an appropriate container. For example, when it is intended to produce the polymer in the form of a film, a small amount of the mixed solution is fed into a shallow container to form the desired film, followed by reaction of the imide monomer with the second monomer. At this time, the thickness of the film can be controlled by adjusting the amount of the mixed solution fed into the container. Alternatively, when it is intended to produce the polymer in the form of a lump or powder, a large amount of the solution is fed into a deep container, followed by reaction of the imide monomer with the second monomer. If the polymer is soluble in a solvent, the mixed solution can be heated to evaporate the solvent.

A composite film reinforced with a porous film can be produced by the following methods, for example, (1) a method wherein a porous film is placed on the bottom of a shallow container, a small amount of the mixed solution is fed downwardly, a porous film is impregnated with the mixed solution, and the monomers are reacted inside the porous film, and (2) a method wherein the polymer is synthesized in the form of a lump or powder, dissolved in an appropriate solvent or melted by heating to impregnate a porous film with the solution or molten solution.

In the case where a catalytic reagent is included in the mixed solution, the reaction proceeds to some extent within the mixed solution and as a result the viscosity of the mixed solution may be increased. When it is intended to produce the composite film using the viscose mixed-solution, a small amount of the mixed solution is fed from the upper portion of a porous film and then the mixed solution is pressurized into the porous film. At this time, the mixed solution can be uniformly or partially filled into the porous film by adjusting the viscosity and/or pressure of the mixed solution.

The reaction between the imide monomer and the second monomer is preferably carried out in an inert atmosphere, such as Ar or $N_2$, in order to prevent the degradation, e.g., hydrolysis, of the monomers. The reaction temperature, time and pressure are suitably selected, without any particular limitation, according to the kinds of the imide monomer and the second monomer, the concentration of the mixed solution, and the kind and amount of the catalytic reagent.

After completion of the reaction, the polymer is taken out of the container, and optionally, the polymer is formed into a film. Thereafter, bonding points and unreacted groups are converted to acid groups.

This conversion to acid groups can be carried out by the following methods, for example, (1) a method wherein the polymer is treated with an acid, such as nitric acid, to protonate the synthesized polymer, and (2) a method wherein the synthesized polymer is saponified using an alkaline solution and treated with an acid to protonate the polymer. In addition, the obtained acid groups can be reacted with lithium hydride to exchange the protons of the acid group with lithium ions.

EXAMPLES

Example 1

An ion conductive polymer having the composition —$[(CF_2)_3—SO_2NHSO_2NHSO_2]_n$— was prepared in accordance with the following procedure.

(1) In a 100-mL round bottom flask equipped with a polytetrafluoroethylene-coated magnetic stir bar, a three-way stopcock, and an Ar (g) inlet was placed 3.12 g (0.0325 mol) of sulfone amide (SA). To the SA was added 25 mL of 1,8-diazabicyclo[5.4.0]-un-7-decane (DBU) and the mixture was stirred until all was dissolved under Ar (g).

To the mixture was added 10.27 g (0.0325 mol) of perfluoropropyl disulfonyl chloride (PPDSF). When the stopcock was closed, the reaction mixture became too viscose to stir. It was heated slowly to 110° C. and reacted for 16 hours. The black mixture was then cooled to room temperature and solidified.

(2) Excess DBU was removed under dynamic vacuum (35 Pa at 110° C.). To the remaining mixture was added NaOH (aq.) (44 mL of a 2.93 M solution) and the remaining DBU was extracted with ethyl acetate. The aqueous layer was acidified using a Nafion (registered trademark) column (250 g, Nafion (registered trademark) NR 50 Exchange Resin) until the aqueous eluent was acidic by pH paper. The water was removed by rotary evaporation, leaving a brown viscose liquid.

(3) The residue was then dissolved in ethanol and precipitated in diethyl ether. The ether was removed and the white precipitate was dried leaving a tan polymer.

The polymer was found to have a weight average molecular weight ($M_w$) of $2.1 \times 10^4$ by gel permission chromatography (GPC) in $H_2O$. The polymer was water-soluble. Formula 8 shows the synthetic scheme of the polymer.

[Chemical formula 8]

$$FSO_2CF_2CF_2CF_2SO_2F \text{ (PPDSF)} + H_2NSO_2NH_2 \text{ (SA)}$$

$$\downarrow \text{Base}$$
$$\downarrow \text{Acidification}$$
$$\downarrow \text{Isolation}$$

$$—(SO_2\overset{H}{\underset{|}{N}}SO_2(CF_2)_3SO_2\overset{H}{\underset{|}{N}})_n—$$

EW=185eqH/g

Example 2

An ion conductive polymer having the composition —[$(CF_2)_3$—$SO_2NHSO_2NHSO_2NHSO_2$]$_n$— was prepared in accordance with the following procedure.

(1) In a one-piece reactor was placed 1.02 g (3.29 mmol) of perfluoropropyl disulfonyl amide (PPDSA). To this was added 2.41 mL (17.4 mmol) of triethylamine (TEA). This was stirred at 80° C. until a homogeneous solution was obtained. To this was added 0.377 mL (3.29 mmol) of bis(sulfonyl chloride) imide (IBSCl) and a compact black solid was obtained. It remained at 80° C. for two-hours and then cooled to room temperature.

(2) NaOH (aq., 2.25 mL, 6.6 mmol) was used to remove the TEA salt by heating until no more TEA evolved. The solution was then acidified using a Nafion (a registered trademark) (75 g, Nafion (a registered trademark) NR 50 Resin) column. The resulting solution was rotary evaporated, thereby solvent was evaporated, leaving a dark tan polymer.

The polymer was found to have a weight average molecular weight ($M_w$) of $1.3 \times 10^4$ by gel permission chromatography (GPC) in $H_2O$. The polymer was water-soluble. Formula 9 shows the synthetic scheme of the polymer.

[Chemical formula 9]

$$H_2NSO_2CF_2CF_2CF_2SO_2NH_2 \text{ (PPDSA)} + ClSO_2NHSO_2Cl \text{ (IBSCl)}$$

$$\downarrow \text{Base}$$
$$\downarrow \text{Acidification}$$
$$\downarrow \text{Isolation}$$

$$—(SO_2\overset{H}{\underset{|}{N}}SO_2(CF_2)_3SO_2\overset{H}{\underset{|}{N}}SO_2\overset{H}{\underset{|}{N}})_n—$$

EW=150eqH/g

Example 3

An ion conductive polymer having the composition —[$(CF_2)_8$—$SO_2NHSO_2NHSO_2$]$_n$— was prepared in accordance with the following procedure.

(1) In pre-dried, pre-weighed reactor vials were placed 1.0 g ($1.77 \times 10^{-3}$ mol) of perfluorooctyldisulfonyl fluoride (PODSF) and SA (0.169 g, $1.76 \times 10^{-3}$ mol) under a $N_2$ (g) atmosphere.

(2) To this was added a solvent (THF (tetrahydrofuran), 10.5 mL) and a base (TEA, 8.98 g, $8.8 \times 10^{-2}$ mol) via syringe.

(3) The mixture was then heated to 65° C. in a closed reactor for three days, during which it turned from orange to brown in color.

(4) Then, the solvent was removed leaving a viscose residue.

(5) The residue was washed with 25% HCl to remove any excess base.

(6) The same was washed with water leaving a colored polymer.

The polymer thus prepared was water-insoluble, which enabled the formation of a film. The conductivity of the film was measured to be 0.1 S/cm in water. Formula 10 shows the synthetic scheme of the polymer.

[Chemical formula 10]

$$FSO_2CF_2CF_2CF_2CF_2CF_2CF_2CF_2CF_2SO_2F \text{ (PODSF)} + H_2NSO_2NH_2 \text{ (SA)}$$

$$\downarrow \text{Solvent/base/22-50° C.}$$
$$\downarrow \text{NaOH conversion}$$
$$\downarrow \text{Acidification}$$

$$—(SO_2CF_2CF_2CF_2CF_2CF_2CF_2CF_2CF_2SO_2NHSO_2NH)_n—$$

Example 4

An ion conductive polymer having the composition —[(CF$_2$)$_8$—SO$_2$NHSO$_2$NHSO$_2$NHSO$_2$]$_n$— was prepared in accordance with the following procedure.

(1) To a 100-mL round bottom flask was placed a stir bar, an inert gas bubbler system and a solution of diamine (perfluorooctyl disulfonyl amide (PODSA)) dissolved in a solution of anhydrous CH$_3$CN and TEA. This was refluxed for 90 minutes and cooled to 5° C.

(2) In a separate flask under an inert atmosphere was prepared the dichloride (IBSCl) in a solution of anhydrous CH$_3$CN and TEA.

(3) The dichloride solution was added to the diamine under an inert atmosphere using an addition funnel, drop by drop. After all the dichloride solution was added, the solution was allowed to warm to room temperature, followed by further heating to reflux.

(4) The remaining solution was removed of solvent, and acidified with HNO$_3$, and washed, followed by drying.

The obtained polymer was water-insoluble, which enabled the formation of a film. The conductivity of the film was measured to be 0.14 S/cm in water. Formula 11 shows the synthetic scheme of the polymer.

[Chemical formula 11]

Comparative Example 1

An ion conductive polymer having the composition —[(CF$_2$)$_3$—SO$_2$NHSO$_2$]$_n$— was prepared in accordance with the following procedure.

(1) To a clean dry glass reactor fitted with a glass-teflon (registered trademark) stopcock and an Ar (g) inlet was placed 4.49 mL (0.81 mmol) of a 0.1796 M solution of PPDSA in THF. To this was added 0.5602 mL of TEA. Then, PPDSF (0.2804 g, 0.89 mmol) was added via syringe. The flask was then sealed using a gas/oxygen torch. After heating at 50° C. for 11 days, the sample was opened and volatile components were removed leaving a viscose yellowish brown liquid.

(2) The remaining material was converted to the Na$^+$ form using excess NaOH (aq.) and heated until all traces of TEA were removed. The acid form was obtained using conc. HCl or CF$_3$CO$_2$H, followed by evaporation of all volatiles at 4 mmHg. The remaining polymer was washed with small amounts of water to remove any salts.

The polymer thus prepared was found to have a weight average molecular weight (M$_w$) of 1.3×10$^4$ by gel permission chromatography (GPC) in H$_2$O. The polymer was water-soluble. Formula 12 shows the synthetic scheme of the polymer.

[Chemical formula 12]

Comparative Example 2

[1. Synthesis of ClSO$_2$(CF$_2$)$_8$SO$_2$Cl (PODSC)]

I—(CF$_2$)$_8$—I (196 mg, 0.3 mmol) was dissolved in MeCN in a 30-mL recovery flask, and then H$_2$O (2 mL) was added thereto to obtain a suspension. To the suspension were rapidly added Na$_2$S$_2$O$_4$ (270 mg, 1.3 mmol) and NaHCO$_3$ (140 mL, 1.7 mmol). The mixture was stirred at room temperature for one hour, and as a result, two colorless layers were separated. The solvents removed from the upper layer (MeCN) was evaporated to precipitate a white solid (200 mg). The solid was dissolved in H$_2$O (10 mL) and placed in an ice bath. Chlorine gas was fed to the solution until the dark purple color of iodine disappeared to obtain a colorless crystal. The resulting colorless suspension was filtered and air-dried to obtain 125 mg (yield: about 70%) of a colorless powder perfluorooctyl disulfonyl chloride (PODSC). Formula 13 shows the synthetic scheme of the compound.

[Chemical formula 13]

[2. Synthesis of FSO$_2$(CF$_2$)$_8$SO$_2$F (PODSF)]

KF (168 mg, 2.8 mmol) was placed in a 300-mL recovery flask equipped with a nitrogen balloon and a three-way stopcock, and dried using a heat gun at reduced pressure. Anhydrous MeCN (90 mL) was added to the flask, and then PODSC (312 mg, 0.75 mmol) was rapidly added thereto. The mixture was stirred at room temperature for 24 hours to obtain a colorless suspension. The suspension was poured into 600 mL of ice water to precipitate a white solid (PODSF). Filtration gave 120 mg (yield: about 48%) of the solid. Formula 14 shows the synthetic scheme of the compound.

[Chemical formula 14]

[3. Synthesis of H$_2$NSO$_2$(CF$_2$)$_8$SO$_2$NH$_2$ (PODSA)]

In a 500-mL three-neck flask equipped with a stir bar, an addition funnel, and gas inlet and outlet was condensed 200 mL of liquid ammonia (NH$_3$) at –196° C. It was then warmed to –80° C. To the addition funnel was added a solution of perfluorooctyldisulfonyl fluoride (PODSF) in THF (22.4 g in 122 mL). The PODSF solution was added to the liquid ammonia (NH$_3$) drop by drop over four hours while keeping the $NH_3$ solution at $-70°$ C. to $-80°$ C. It was then allowed to warm to room temperature over eight hours during with excess $NH_3$ was allowed to escape.

The remaining material was acidified with 25% HCl to a volume of 500 mL. The solvents were removed by rotary evaporation leaving only 100 mL of the solution. After stirring at room temperature for 16 hours, a waxy crystalline solid remained. The solid was again acidified in boiling 25% HCl, filtered, and washed until neutral by pH paper. It was then dried overnight at 80° C. under vacuum leaving 10 g of a white crystalline solid (purity: 97% based on NMR). Formula 15 shows the synthetic scheme of the compound.

[Chemical formula 15]

[4. Polymerization]

(1) In pre-dried, pre-weighed reactor vials were placed PODSF (0.102 g, $1.8×10^{-4}$ mol) and PODSA (0.101 g, $1.8×10^{-4}$ mol).

(2) To this was added a solution containing a solvent (THF, 1 mL) and a base (TEA, 0.072 g, $7.1×10^{-3}$ mol) via syringe.

(3) The mixture was shaken to dissolve the reagents at room temperature and heated to 50° C. for three days.

(4) The solvent was removed and the residue was washed with 25% HCl, followed by water.

(5) The remaining material was highly viscose and when pulled formed long weak fiber-like strings.

(6) The material was converted to the sodium form using 0.5 M NaOH and heated to 80° C. for four hours.

(7) The sample was acidified using 15% $HNO_3$ at 50° C. for four hours.

(8) The resulting material was washed and dried leaving a white waxy polymer.

The polymer was water-insoluble, which enabled the formation of a film. The proton conductivity of the film was measured to be 0.05 S/cm in water at 25° C. Formula 16 shows the synthetic scheme of the polymer.

[Chemical formula 16]

Example 5

Figure 1:
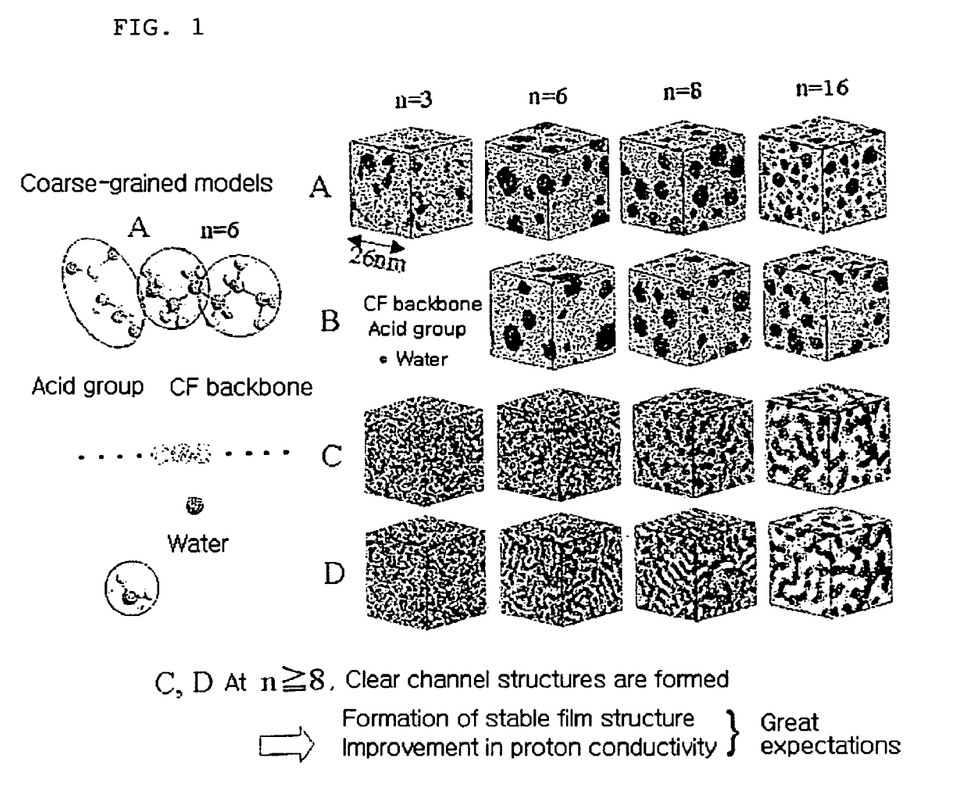
FIG. 1 shows the results of mesoscale simulation for various ion conductive polymers having a multiimide unit and a sulfone imide group.

The channel structures of various ion conductive polymers having the multiimide unit and the sulfone imide group were estimated by mesoscale simulation. Coarse-grained molecular models were used for the mesocale simulation, which was also employed to estimate the channel structures of Nafion (registered trademark), etc. (see, "structural estimation of polymer electrolyte membrane Nafion by mesoscale simulation", Yamamoto et al., Polymer Society of Japan, Fifth Polymer Conference). The simulation was conducted on the following four ion conductive polymers:

(1) Polymer A:

(2) Polymer B:

(3) Polymer C:

(4) Polymer D:

The obtained results are shown in FIG. 1. As is evident from the results, although polymers A and B having the sulfone imide group have a number of carbon atoms in their perfluorinated backbones, clear channel structures are not formed. In contrast, when polymers C and D having the multiimide unit contain eight or more carbon atoms in their perfluorinated backbones, clear channel structures are formed. This is because the multiimide unit is highly hydrophilic when compared to the sulfone imide group. That is, it is thought that when the number of carbon atoms present in the perfluorinated backbones is larger than a particular value, the phase separation of the hydrophilic moieties from the hydrophobic moieties is very complete.

The results of FIG. 1 show that when the number of carbon atoms present in the perfluorinated backbones of the polymers C and D having the multiimide unit decreases, clear channel structures are not formed, indicating that when the number of carbon atoms in the perfluorinated backbones is not larger than a particular value, the polymers become water soluble.

The simulation results of FIG. 1 agree well with the results obtained in Examples 1 to 4 and Comparative Examples 1 to 3.

The present invention has been described herein with reference to its preferred embodiments. These embodiments do not serve to limit the invention, and various modifications and changes can be made without departing from the spirit of the invention.

INDUSTRIAL APPLICABILITY

As apparent from the foregoing, the ion conductive polymers of the present invention are particularly suitable as electrolyte membranes and electrolytes in the catalyst layers for solid polymer fuel cells, but the applications of the ion conductive polymers are not limited thereto. The ion conductive polymers of the present invention can be used as electrolyte membranes and electrolytes in the catalyst layers for use in a variety of electrochemical devices. In addition, the ion conductive polymers of the present invention can be used as lithium ion conductors for use in lithium batteries, e.g., lithium ion batteries.

What is claimed is:

1. An ion conductive polymer, comprising:
a unit represented by Formula (1) below:

(1)

wherein $X_1$ is an integer greater than 1, and
$M^+$ is $H^+$ or $Li^+$;
wherein the ion conductive polymer has a molecular weight of 10,000 or higher.

2. An ion conductive polymer, comprising;
a unit represented by Formula 2 below:

$$-(CF_2)_n-SO_2[N^-SO_2(M^-)]_{X1}- \quad (2)$$

wherein n is an integer from 1 to 19,
$X_1$ is an integer greater than 1, and
$M^+$ is $H^+$ or $Li^+$;
wherein the ion conductive polymer has a molecular weight of 10,000 or higher.

3. The ion conductive polymer according to claim 2, wherein n is an integer of 8 or greater.

4. An ion conductive polymer, comprising:
a unit represented by Formula (3) below:

$$-(CF_2)_n-SO_2[N^-SO_2(M^+)]_{X1}-(CF_2)_m-SO_2[N^-SO_2(M^{30})]_{X2}- \quad (3)$$

wherein n is an integer from 1 to 19,
m is an integer from 1 to 19,
$X_1$ is an integer greater than 1,
$X_2$ is an integer greater than 1, and $M^+$ is $H^+$ or $Li^+$.

5. The ion conductive polymer according to claim 4, wherein at least either m or n is an integer of 8 or greater.

6. The ion conductive polymer according to claims 4 or 5, wherein the ion conductive polymer has a molecular weight of 10,000 or higher.

7. An imide monomer represented by Formula (A) below:

$$Z_1\text{-}SO_2[N^-SO_2M^+]_Y\text{-}Z_2 \quad (A)$$

wherein Y is an integer of 2 or greater,
$Z_1$ is OH, F, Cl, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

8. An imide monomer represented by Formula (B) below:

$$Z_1\text{-}SO_2[N^-SO_2M^+]_{Y1+1}-R_f-SO_2[N^-SO_2M^+]_{Y2+1}\text{-}Z_2 \quad (B)$$

wherein $Y_1$ is an integer of 0 or greater,
$Y_2$ is an integer of 0 or greater,
$R_f$ is $-(CF_2)_m$-(in which m is an integer from 1 to 19),
$Z_1$ is OH, F, CL, Br, I or $NZ_3Z_4$ (in which $Z_3$ and $Z_4$ are each independently H, M or $SiMe_3$, and M is a metal element),
$Z_2$ is OH, F, Cl, Br, I or $NZ_3Z_4$ (in which $Z_3$ and $Z_4$ are each independently H, M or $SiMe_3$, and M is a metal element), and
$M^+$ is $H^+$ or $Li^+$.

* * * * *

UNITED STATES PATENT AND TRADEMARK OFFICE
CERTIFICATE OF CORRECTION

PATENT NO. : 7,592,375 B2  Page 1 of 1
APPLICATION NO. : 11/415116
DATED : September 22, 2009
INVENTOR(S) : Greg Shafer et al.

It is certified that error appears in the above-identified patent and that said Letters Patent is hereby corrected as shown below:

Column 27, line 7, "(M $^-$)]X1-" to (M $^+$)]X1-

Column 27, line 19, "(M $^{30}$)]X2-" to (M $^+$)]X2-

Column 28, line 20, "CL" to C1

Signed and Sealed this

Fourth Day of May, 2010

David J. Kappos
*Director of the United States Patent and Trademark Office*